Figure 1:
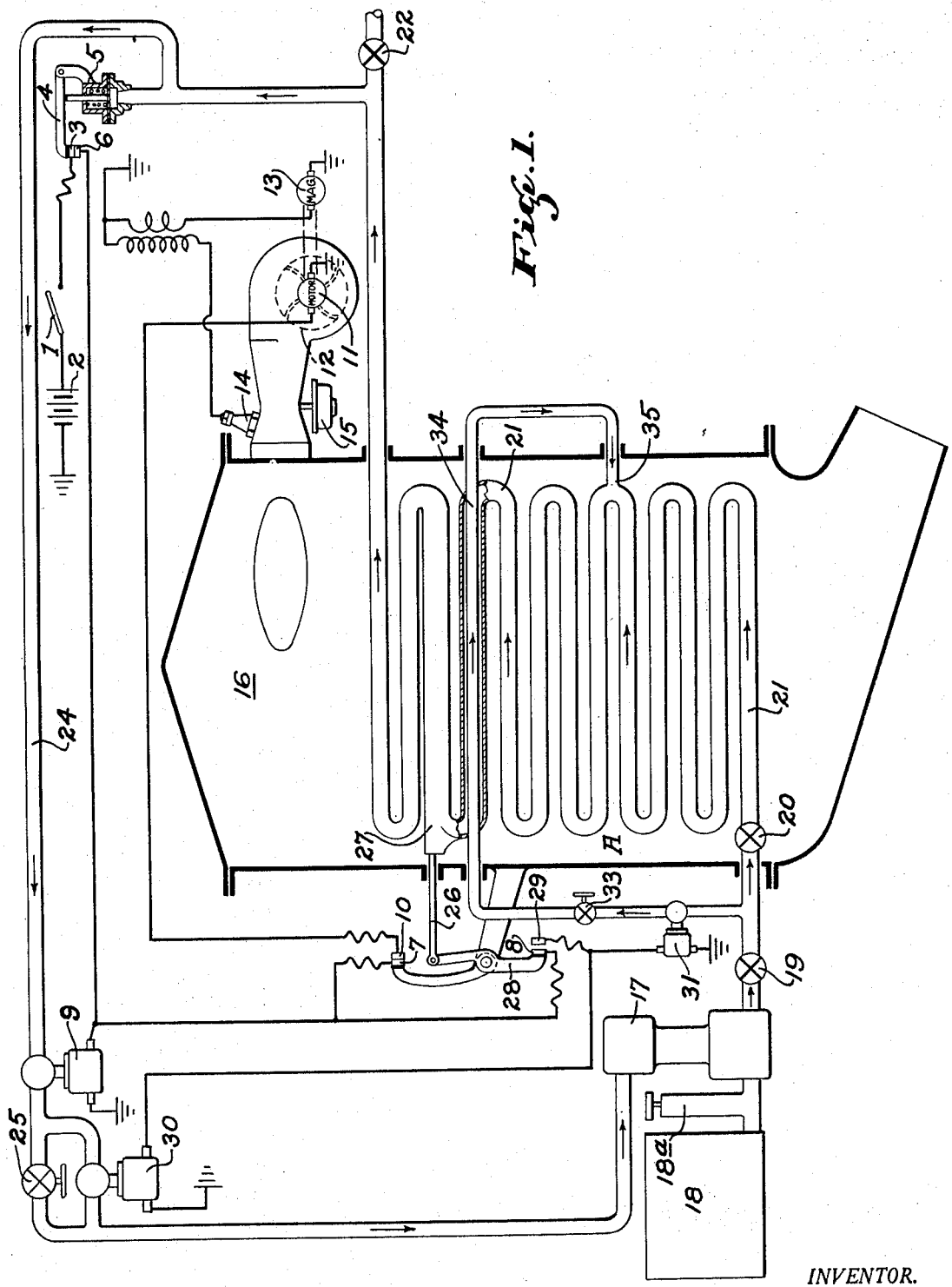

Feb. 9, 1937. W. J. BESLER 2,070,075
CONTROL
Filed April 30, 1934 2 Sheets-Sheet 1

INVENTOR.
William J. Besler
BY A. Donham Owen
ATTORNEYS.

Feb. 9, 1937.  W. J. BESLER  2,070,075
CONTROL
Filed April 30, 1934   2 Sheets-Sheet 2
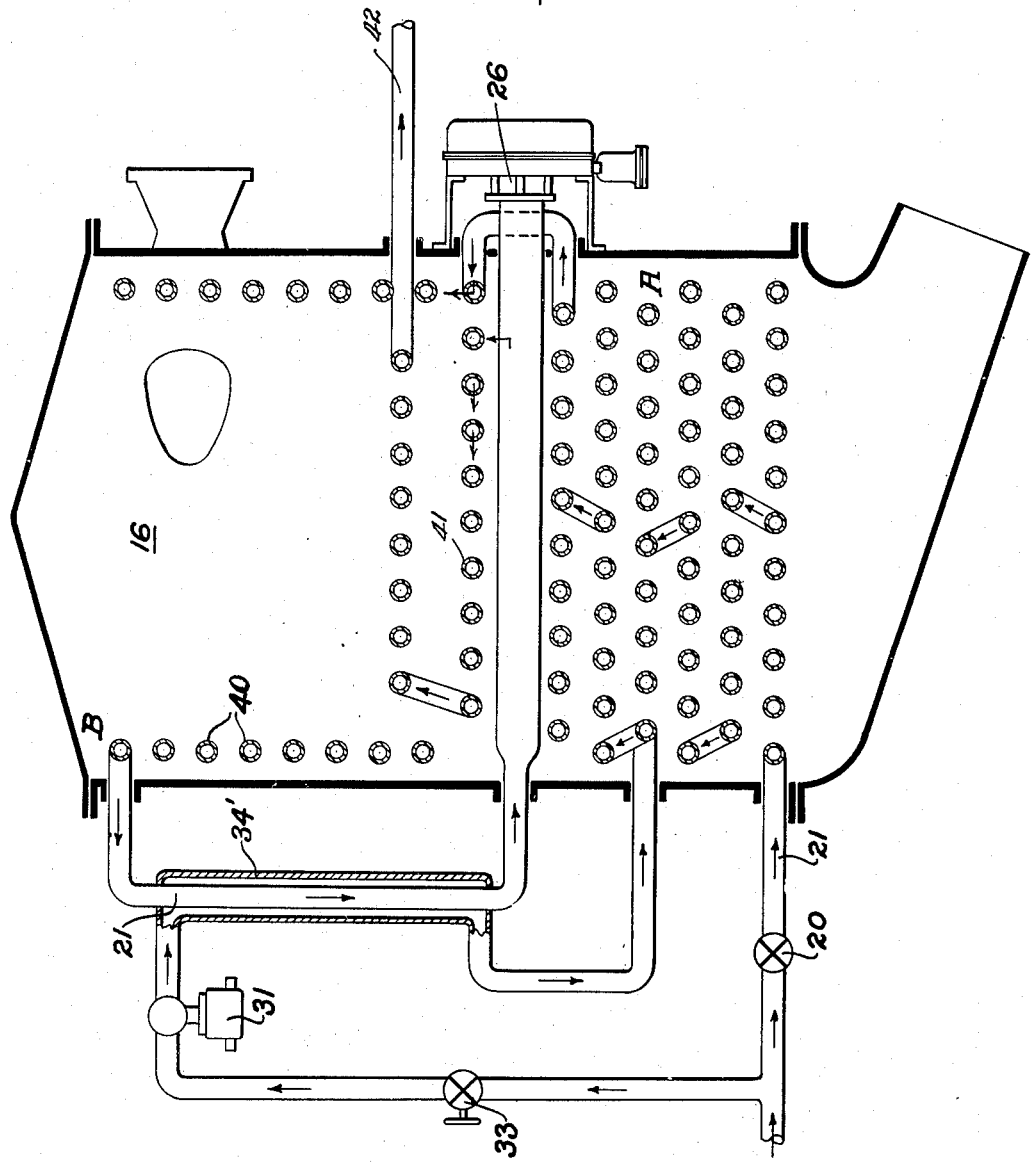
INVENTOR.
William J. Besler.
BY A. Donham Owen
ATTORNEY Patented Feb. 9, 1937

2,070,075

UNITED STATES PATENT OFFICE 2,070,075

CONTROL

William J. Besler, Oakland, Calif.

Application April 30, 1934, Serial No. 723,119

7 Claims. (Cl. 122—451.1)

This invention relates to a method of boiler control, by which it is sought to maintain a constant outlet vapor temperature. The invention is here described in connection with a continuous flow generator which is designed to work satisfactorily under varying load conditions. It may be employed with a series-parallel assembly of coils in a continuous flow generator or in other types of generators.

It has been found to be commercially impractical to supply fluid to a continuous flow generator in direct proportion to the heat released without expensive and elaborate mechanisms, and even when so arranged, the system may be thrown off balance, in a variable load installation, by a sudden drain on the boiler with consequent load fluctuations and consequent upsetting of temperature balances.

Hence, the method usually employed to control a boiler of the above description is to admit fluid to the boiler entrance in approximate proportion to the heat released, but at a rate which is slightly under the required amount of fluid for normal evaporation. The additional required amount of fluid is then admitted in response to vapor temperature by thermostatically controlled means,—either mechanical or electrical. This additional supply of fluid may be admitted at the boiler entrance, or in the vapor zone, or simultaneously in the vapor and liquid zones, but it has been found that to secure good boiler control this additional fluid must be admitted in such a way as to cool the vapor before and in proximity to the thermostat so that the thermostat will be immediately affected to interrupt the additional supply of fluid.

It has been found by experimentation that if the additional supply of fluid is not admitted in some way so as to cool the vapor, before it reaches the thermostat, and hence directly affect the thermostat, that the liquid level may rise very high within the tubing before the thermostat will respond and shut off the additional fluid supply. Should this condition coincide with a sudden demand for power from the generator, such as a wide-opened throttle, this high liquid level, or liquid and vapor level, commonly referred to as the latent heat zone, will be rapidly pushed ahead, that is toward the thermostat. It has been found that the temperature at the thermostat, which is usually close to the boiler outlet, will remain unchanged until the latent heat zone has approached or actually reached the thermostat, at which instant the thermostat acts to interrupt the additional supply of fluid, but it is then too late to prevent the temperature at the boiler outlet from dropping off. The fire is inadequate to maintain the desired temperature when this condition comes about. This drop in temperature is not desirable, as the engine's economy is seriously affected thereby and the power plant's output is diminished at a time when the maximum power is required.

To prevent this rise in the liquid level and the progressive forward motion of the latent heat zone which culminates in a vapor temperature drop, it is necessary to give the thermostat advance notice of what is happening in the lower portion of the generator. This can be done by cooling the vapor before and in the region of the thermostat so that the thermostat will be affected thereby to interrupt the additional supply of fluid before the liquid level has risen too high, and before the so-called saturation zone has progressed to the vicinity of the thermostat.

One of the objects of this invention is to provide a method of cooling the vapor in proximity to the thermostat by passing a portion of the feed fluid through a cooling tube within the boiler tubing, or through a jacket surrounding the boiler tubing at this point.

Another object of the invention is to prevent the formation of carbon or the deposit of other foreign material which may occur on the point of the injecting nozzle or in that vicinity.

Other objects of the invention will be apparent from the following detailed descriptions.

In the accompanying drawings forming a part of this specification:

Fig. 1 is a schematic diagram showing the general arrangement of the control system employed, and Fig. 2 is a diagrammatic cross section of a boiler showing a suggested arrangement of the tubing, slightly modified.

In Fig. 1, the cooling tube 34 is arranged within the boiler tube 21, whereas in Fig. 2, the cooling tube is applied as a jacket 34' around the boiler tube 21.

The operation of the generator and controls can best be described by following the function of the various control elements from the beginning of generation, or the steam-up, thru the whole range of boiler conditions which may obtain in practical operation.

To begin with, the operator throws master switch 1. This connects the battery 2 to terminal 3 on the pressure regulator arm 4, which is actuated by the pressure regulator 5. Terminals 3 and 6 are in abutment whenever the steam pressure is down, as it will be during "steam-up", and since the temperature is down, the circuit will be completed thru terminals 7 and 10, to the burner motor 11 and then to ground. At the same time a circuit will be completed to the solenoid controlled valve 9 and then to ground. Upon completion of the first mentioned circuit the burner motor will begin rotation and upon completion of the second circuit the valve 9 will open admitting steam to the water pump engine 17. Ignition is provided whenever the burner motor 11 rotates the magneto 13.

The electric blower motor 11, drives an air fan 12, and a magneto 13. The latter supplies a spark at 14, which ignites the fuel from the aspirating carburetor 15, and fire occurs in the combustion chamber 16. Fuel may be supplied to the carburetor by any of the well known devices which need no description here as they do not constitute a part of this present invention.

There is normally some liquid in the boiler, or if not, the operator has seen to it, before closing the switch 1, that some liquid is forced into the boiler by manual means, such as the water pump 18a, which draws liquid from the main reservoir 18 and introduces it through check valves 19 and 20 to the boiler tubing 21.

After ignition takes place, vapor pressure will soon be generated in the boiler tubing 21, which connects, with the throttle 22, with the pressure regulator 5 and thru the conduit 24 to the steam water pump engine 17. Since both pressure and temperature are down, the solenoid 9 is holding its valve open and vapor can flow past hand regulator valve 25 to the steam water pump engine 17, supplying liquid to the boiler. The hand regulator valve 25 is set so that the pump will supply fluid to the boiler at a rate which is below the amount required by the fire for normal evaporation. The pressure then begins to rise in the vapor generator and the temperature also rises until predetermined boiler conditions are reached.

In the case where water is employed as the operating fluid, the pressure condition may be about 1200 lbs. of pressure, at which point the pressure regulator 5, operates to break the electrical circuit between contacts 3 and 6, which shuts off both the fire and the fluid supply.

Control by the temperature condition, in the case of steam, is accomplished by having the thermostat 26, in casing 27, set to close the circuit to the solenoid controlled valves 30 and 31 thru terminals 8 and 29 thereby increasing the supply of liquid. If the temperature continues to rise, say to about 800° F., the thermostat 26 opens terminals 7 and 10 thereby shutting down the fire, but leaving the fluid supplying means in full operation. The latter would suspend only if the pressure became excessive and opened terminals 3 and 6.

The thermostat rod 26 may be made of copper or some suitable material to give a differential expansion from the casing 27 so that at approximately 750° F. the thermostatically actuated temperature arm 28 will force terminal 8, into contact with terminal 29. Opening of the solenoid controlled steam valve 30, allows a large volume of steam to by-pass the hand valve 25, whereby the flow of steam to the feed pump will increase and the pump consequently will speed up and supply more liquid to the boiler tubing 21.

The problem comes in preventing this additional supply of water from bringing the boiler to a flood condition as heretofore described. This is solved by having an additional circuit of feed fluid introduced in such a way as to give the thermostat 26, advance notice of conditions in the primary portion A, of the boiler.

This is accomplished by the solenoid controlled water valve 31, which operates simultaneously with solenoid controlled steam valve 30. Valve 31 allows feed liquid to flow through a hand regulated needle valve 33 to a jacket or tube within the boiler tubing 34, which liquid serves to cool the steam or other vapor, directly before the thermostat, thus cooling the thermostat rod 26 which operates to break the contact between terminals 8 and 29 and shut off the additional supply of water. Thus the jacket acts upon the thermostat just as a jet of water injected into the steam zone at the same point would. The hand regulating valve 33 is provided between the solenoid 31 and the jacket 34 to provide manual means of adjusting the flow of water thru to this secondary circuit to give the desired operating characteristics and prevent too great a flow through the jacket. This additional supply of feed liquid after passing through the jacket may be introduced any place intermediate the jacket and boiler entrance such as at 35. I prefer to introduce such liquid well into the saturation zone so that a free flow of liquid through the jacket will occur because this point of introduction shunts the pressure drop through the boiler tubing between check valve 20 and point 35.

Thus it will be seen that as soon as the temperature conditions requires additional feed fluid, a metered portion of this fluid is sent thru the tube 34, where it extracts heat units from the vapor in the boiler tube 21, thereby cooling the vapor. Valve 33 makes it possible to meter through the tube 34 the right proportion of this additional feed fluid so as to cause thermostat 26 to separate the terminals 8 and 29, and shut down the valve 31 before too great a rise in the liquid level has occurred.

Fig. 2 shows in cross-section a boiler as constructed with my invention applied in jacket form. Until the vapor temperature rises to where valve 31 is opened, the feed fluid passes thru check valve 20 into the boiler tube 21, where it traverses the lower tubes in the A section of the boiler, then the single spiral tube 40 in the upper section, then out at B and down into the middle center zone. The thermostat 26 is arranged in the tube in the last mentioned zone. The jacket 34' surrounds the tube just ahead of the thermostat. The operation of this arrangement is identical with the foregoing description of Fig. 1.

Other modifications of this invention will be apparent to those skilled in the art and I do not wish this invention to be limited to the specific structure disclosed.

What I claim is:

1. A control for a continuous flow generator comprising a boiler tube having an inlet and an outlet, a casing surrounding said boiler tube, a burner arranged in said casing to heat said boiler tube, a thermostatic control arranged in said tube, a heat transferring means in connection with said tube on the inlet side of said thermostatic control, means for increasing the supply of liquid into the boiler whenever liquid is fed through said heat transferring means, and means for passing through said heat transferring means a metered portion of the liquid introduced into the boiler tube in response to thermostatic action.

2. In a vapor generator of the continuous flow type the combination of a boiler, a thermostat intermediate the boiler inlet and outlet, a tube within said boiler tubing in advance of said thermostat, means for passing liquid thru said tube in response to temperature fluctuation, and means for then introducing said liquid into the boiler intermediate the boiler inlet and the place where said tube is located in the boiler.

3. In a vapor generator of the continuous flow type, the combination of a boiler tube, a thermostat intermediate said tube inlet and outlet, a jacket surrounding a portion of said boiler tube in advance of said thermostat, means to force liquid through said tube in response to temperature fluctuation, means to control the amount of liquid passed through said jacket, and means for then introducing said liquid into the boiler tubing intermediate the boiler inlet and the place where said tube is located in the boiler.

4. In a boiler control system, the combination of a tube having an inlet and outlet, means for heating said tube, means for forcing liquid through said tube, a pressure responsive device in said tube, a temperature responsive means in said tube, means for causing additional liquid to be forced through said tube, means for controlling said last named means which are operated in response to said temperature means, means for interrupting said heating means upon a predetermined rise in vapor temperature in said tube, means located in advance of said temperature responsive means for conducting a metered amount of said additional liquid into thermally effective relation to a portion of said tube and the vapor therein, means for introducing said additional liquid into said tube intermediate the inlet and said last named means, and means operated by said pressure responsive device for simultaneously interrupting said heating means and said additional feeding means upon a predetermined rise in boiler pressure.

5. In a boiler control system, the combination of a tube having an inlet and outlet, a casing surrounding said boiler tube, a burner arranged in said casing to heat said boiler tube, means for forcing liquid through said tube, a temperature responsive means in said tube, means for causing additional liquid to be forced through said tube, means for conducting a metered amount of said additional liquid into thermally effective relation to a portion of said tube and the vapor therein in advance of said temperature responsive means, and means for controlling said two last named means which are operated in response to said temperature means.

6. In a continuous flow generator the combination of a boiler tube, a liquid forcing means, a control device for effecting the operation of said last named means, another control device for causing a speeding up of said liquid forcing means causing additional feed water to be supplied thereby, a heat transferring means in contact with said boiler tube, a third control device operated simultaneously with said last-named control device to connect said heat transferring means with said liquid forcing means, a thermostat affected by the vapor in said boiler tube to effect operation of said two last-named control devices when the vapor temperature reaches a predetermined point whereby said liquid forcing means will force a supply of liquid thru said heat transferring means to lower the vapor temperature in proximity to said thermostat, and will simultaneously force a supply of liquid into the inlet of said tube in addition to that already entering said inlet.

7. In a continuous flow generator the combination of a boiler tube, a liquid forcing means, a control device for effecting the operation of said last-named means, another control device for causing a speeding up of the flow of the feed water, a heat transferring means in contact with said boiler tube, a third control device operated simultaneously with said last-named control device to connect said heat transferring means with said liquid forcing means, a thermostat affected by the vapor in said boiler tube to effect operation of said two last-named control devices when the vapor temperature reaches a predetermined point whereby said liquid forcing means will force a supply of liquid through said heat transferring means to lower the vapor temperature in proximity to said thermostat, and will simultaneously force a supply of liquid into the inlet of said tube in addition to that already entering said inlet.

WILLIAM J. BESLER.